(12) United States Patent
Li et al.

(10) Patent No.: US 11,899,264 B2
(45) Date of Patent: Feb. 13, 2024

(54) CONNECTOR

(71) Applicant: Huawei Technologies Co., Ltd., Shenzhen (CN)

(72) Inventors: Yuanyuan Li, Wuhan (CN); Biao Qi, Wuhan (CN); Xiupeng Li, Wuhan (CN)

(73) Assignee: HUAWEI TECHNOLOGIES CO., LTD., Shenzhen (CN)

( * ) Notice: Subject to any disclaimer, the term of this patent is extended or adjusted under 35 U.S.C. 154(b) by 148 days.

(21) Appl. No.: 17/181,428

(22) Filed: Feb. 22, 2021

(65) Prior Publication Data

US 2022/0043229 A1 Feb. 10, 2022

Related U.S. Application Data

(63) Continuation of application No. PCT/CN2020/107183, filed on Aug. 5, 2020.

(51) Int. Cl.
*G02B 6/44* (2006.01)

(52) U.S. Cl.
CPC ................... *G02B 6/4472* (2013.01)

(58) Field of Classification Search
CPC .................................................. G02B 6/4472
See application file for complete search history.

(56) References Cited

U.S. PATENT DOCUMENTS

| | | | |
|---|---|---|---|
| 5,465,313 A | 11/1995 | Belenkiy et al. | |
| 6,612,751 B1 | 9/2003 | Watanabe et al. | |
| 7,572,066 B2 | 8/2009 | De Jong et al. | |
| 10,295,760 B1* | 5/2019 | Bureacov | G02B 6/3895 |
| 10,539,758 B2* | 1/2020 | Butler | G02B 6/38875 |
| 2005/0213890 A1 | 9/2005 | Barnes et al. | |
| 2006/0093278 A1 | 5/2006 | Elkins, II et al. | |
| 2007/0230881 A1 | 10/2007 | Tammela et al. | |
| 2015/0346448 A1 | 12/2015 | Wu | |

FOREIGN PATENT DOCUMENTS

| | | |
|---|---|---|
| CN | 101806940 A | 8/2010 |
| CN | 101806940 B | 2/2012 |
| CN | 102707391 A | 10/2012 |
| CN | 206710647 U | 12/2017 |
| CN | 109283628 A | 1/2019 |
| CN | 109283628 B | 7/2020 |
| JP | 2000284152 A | 10/2000 |
| JP | 2007531015 A | 11/2007 |
| JP | 2008501152 A | 1/2008 |
| JP | 2008532073 A | 8/2008 |
| JP | 2009175612 A | 8/2009 |
| JP | 2009222983 A | 10/2009 |
| JP | 2010237233 A | 10/2010 |

(Continued)

*Primary Examiner* — Sung H Pak
*Assistant Examiner* — Hoang Q Tran
(74) *Attorney, Agent, or Firm* — Conley Rose, P.C.

(57) ABSTRACT

A connector includes a first light transmission part and a second light transmission part, and when the connector is connected to an optical component, observing, by using the first light transmission part and the second light transmission part on an equipment room side, a detection light to identify the connector, and identifying an output port through which a user-side optical network unit (ONU) is connected to an equipment-room-side splitter.

20 Claims, 7 Drawing Sheets

(56) References Cited

FOREIGN PATENT DOCUMENTS

| JP | 2013196960 A | 9/2013 | |
|----|----|----|----|
| WO | 2005096050 A2 | 10/2005 | |
| WO | 2006090001 A1 | 8/2006 | |
| WO | 2017176828 A2 | 10/2017 | |
| WO | WO-2017185898 A1 * | 11/2017 | ........... G02B 6/2852 |
| WO | 2017176828 A3 | 1/2018 | |

* cited by examiner

CONNECTOR

CROSS-REFERENCE TO RELATED APPLICATIONS

This application is a continuation of International Patent Application No. PCT/CN2020/107183 filed on Aug. 5, 2020, which is hereby incorporated by reference in its entirety.

TECHNICAL FIELD

Embodiments of this application relate to the field of optical fiber connector technologies, and especially, to a connector.

BACKGROUND

An optical communication network is a network in which an optical conduction tool is connected to a company, a home, or an equipment room based on a total reflection principle of light in a fiber (that is, an optical fiber) made of glass or plastic. A typical passive optical network (PON) is a point-to-multipoint optical fiber access technology. The PON mainly includes one optical line terminal (OLT) installed in a central control station and a batch of auxiliary optical network units (ONUs) installed on a user side. The OLT is connected to the plurality of ONUs in a point-to-multipoint manner by using an optical splitter. In the connection between the ONUs, the splitter, and the OLT, the ONUs are connected to output ports of the splitter by using optical fibers and connectors.

The plurality of ONUs each are relatively far away from the splitter. Therefore, the optical fibers between the splitter and the plurality of ONUs are entangled together. In this case, on an equipment room side, it is increasingly difficult to identify a port through which an optical fiber connector is connected to the splitter. Consequently, when a user replaces a network or replaces an optical fiber, it is difficult to disconnect an optical fiber connector from a port of the splitter. Therefore, how to accurately and quickly identify a port through which an optical fiber connector is connected to an optical component is an urgent problem to be resolved in an optical fiber network connection.

SUMMARY

Embodiments of this application provide a connector. Therefore, when the connector is connected to an optical component, light carried on an optical fiber inside the connector can be visualized, so that it is ensured that an installation engineer accurately and quickly identifies a port through which the connector is connected to the optical component, and a problem that it is difficult to identify a port connected to an optical fiber connector is resolved.

An embodiment of this application provides a connector, including a housing, a ferrule assembly, where at least a part of the ferrule assembly is located inside the housing, and an optical fiber, where at least a part of the optical fiber is located inside the ferrule assembly.

A first light transmission part is disposed on an outer wall of the ferrule assembly, a second light transmission part is disposed on the housing, the second light transmission part and the first light transmission part at least partially overlap, and the first light transmission part and the second light transmission part are used to observe light carried on the optical fiber.

The first light transmission part and the second light transmission part are disposed on the connector, the second light transmission part and the first light transmission part at least partially overlap, and the first light transmission part and the second light transmission part are used to observe the light carried on the optical fiber. Therefore, when the connector is connected to an optical component, and when detection light (such as red light) is input into the optical fiber connected to a user-side ONU, the detection light may be observed by using the first light transmission part and the second light transmission part on an equipment room side, so that the connector can visualize the light carried on the optical fiber. In this way, an installation engineer can determine, by observing the second light transmission part on the connector on the equipment room side, the user-side ONU connected to the connector, and further identify a port through which the connector is connected to the optical component (for example, a splitter). Therefore, when a user replaces an operator, or replaces a connector or an optical fiber, or repairs a port of an optical component, a corresponding output port through which a user-side ONU is connected to an equipment-room-side splitter can be accurately and quickly identified, so that the installation engineer easily disconnects a connector from the output port of the optical component, thereby preventing a network of another user from being interrupted. Therefore, according to the connector provided in this embodiment of this application, a port through which the connector is connected to an optical component is accurately and quickly identified, thereby helping the installation engineer to replace or repair a network of a user, and resolving a problem that it is difficult to identify a port connected to an optical fiber connector.

In a possible implementation, the ferrule assembly includes a ferrule and a flange connected to one end of the ferrule, at least a part of the ferrule is located at one end of the housing, and one end that is of the flange and that is away from the ferrule extends to the other end of the housing.

A channel through which the optical fiber can pass is disposed inside the ferrule and the flange.

The first light transmission part is disposed on an outer wall of the ferrule, or the first light transmission part is disposed on an outer wall of the flange, or the first light transmission part is disposed on an outer wall of each of the ferrule and the flange.

In a possible implementation, the first light transmission part includes at least one of a first light transmission hole and a first light transmission area made of transparent materials.

In a possible implementation, the outer wall of the flange further has a branch structure, and the branch structure is provided with the first light transmission hole connected to the channel inside the flange, or a part or all of an area of the branch structure is the first light transmission area, and the outer wall that is of the flange and that is connected to the branch structure is provided with the first light transmission hole connected to the channel inside the flange, or the branch structure is provided with the first light transmission hole, an area of the outer wall that is of the flange and that is connected to the branch structure is the first light transmission area, and the first light transmission hole and the first light transmission area at least partially overlap.

In a possible implementation, the outer wall of the flange is provided with a mounting hole, a guide structure is assembled at the mounting hole, and the guide structure is provided with a guide channel connected to the channel inside the flange.

The guide structure is provided with the first light transmission hole connected to the guide channel, or a part or all of an area of the guide structure is the first light transmission area, or a part of an area of the guide structure is provided with the first light transmission hole, a part of the area of the guide structure is the first light transmission area, and the first light transmission hole and the first light transmission area at least partially overlap.

In a possible implementation, a part of an outer wall of the guide structure extends to the second light transmission part.

In a possible implementation, the optical fiber includes a main optical fiber and a branch optical fiber connected to the main optical fiber, and one end of the main optical fiber passes through the channel inside the ferrule assembly and extends to an end face of one end of the ferrule assembly.

The branch optical fiber is opposite to the first light transmission part, or the branch optical fiber passes through the first light transmission part and extends to the second light transmission part.

In a possible implementation, the second light transmission part includes at least one of a second light transmission hole and a second light transmission area made of transparent materials.

In a possible implementation, the housing includes an outer housing and an inner housing, at least a part of the inner housing is located inside the outer housing, and at least a part of the ferrule assembly is located inside the inner housing.

In addition, the second light transmission part is disposed on the outer housing, or the second light transmission part is disposed on the inner housing, or the second light transmission part is disposed on each of the outer housing and the inner housing.

In a possible implementation, the inner housing includes a frame sleeve and a base, the outer housing is sleeved on at least the frame sleeve, and at least a part of the ferrule is located inside the frame sleeve.

The base is sleeved on a part of the outer wall of the flange.

One end of the base is connected to the frame sleeve.

A part of the base is located inside the outer housing.

The base is provided with the second light transmission part.

In a possible implementation, the connector further includes an elastic component. The elastic component is sleeved on the flange, one end of the elastic component presses against a protrusion on the outer wall of the flange, and the other end of the elastic component presses against a boss on an inner wall of one end of the base.

The elastic component is configured to arrange the ferrule assembly in the housing in a telescopic manner.

In a possible implementation, the one end of the base extends into the frame sleeve and is connected to the frame sleeve, and the other end of the base extends out of the outer housing and the frame sleeve.

One end of the flange is connected to the ferrule, and the other end of the flange extends into the one end that is of the base and that is located inside the frame sleeve.

The outer housing is provided with the second light transmission hole, or a part or all of an area of the outer housing is the second light transmission area, or a part of an area of the outer housing is the second light transmission area, a part of the area of the outer housing is provided with the second light transmission hole, and the second light transmission hole and the second light transmission area at least partially overlap.

An opening is disposed at a position at which the frame sleeve is opposite to the second light transmission hole or the second light transmission area.

The elastic component is located at the one end that is of the base and that extends into the frame sleeve.

An outer wall at one end that is of the flange and that is close to the base has the protrusion.

In a possible implementation, one end of the base extends into the outer housing and is connected to the frame sleeve inside the outer housing, and the other end of the base extends out of the outer housing.

The base is sleeved on the part of the outer wall of the flange, and one end of the base is close to one end that is of the flange and that faces the ferrule.

An outer wall that is of the base and that extends out of the outer housing is provided with the second light transmission hole, or a part or all of an outer wall that is of the base and that extends out of the outer housing is the second light transmission area, or a part of an outer wall that is of the base and that extends out of the outer housing is the second light transmission area, a part of the outer wall that is of the base and that extends out of the outer housing is provided with the second light transmission hole, and the second light transmission hole and the second light transmission area at least partially overlap.

In a possible implementation, the housing further includes a light transmission sleeve on which the outer housing or the base is sleeved, and the light transmission sleeve covers at least the second light transmission hole or the second light transmission area.

The connector further includes a tail ferrule, and the tail ferrule is connected to one end that is of the base and that is located outside the outer housing.

In addition, one end of the optical fiber passes through the tail ferrule and enters the ferrule assembly.

The connector further includes a pressure ring. The pressure ring is located at one end that is of the tail ferrule and that is close to the base. The pressure ring is configured to fasten the optical fiber inside the tail ferrule.

Description of drawing reference signs: 10 represents "housing"; 11 represents "outer housing"; 12 represents "frame sleeve"; 13 represents "base"; 131 and 111 represent "second light transmission hole"; 132 represents "boss"; 20 represents "ferrule assembly"; 21 represents "ferrule"; 211 represents "end face"; 22 represents "flange"; 221 represents "first light transmission hole"; 222 represents "protrusion"; 223 represents "channel"; 224 represents "mounting hole"; 225 represents "branch structure"; 30, a1, b1, c1, and d1 represent "optical fiber"; 31 represents "main optical fiber"; 32 represents "branch optical fiber"; 40 represents "elastic component"; 50 represents "light transmission sleeve; 60 represents "pressure ring"; 70 represents "tail ferrule"; 80 represents "guide structure"; 81 represents "guide channel"; 101 represents "first light transmission part"; 102 represents "second light transmission part"; a3, b3, c3, d3, and 100 represent "connector"; and 200 represents "adapter".

DESCRIPTION OF EMBODIMENTS

Some terms used in implementations of the embodiments of this application are merely used to explain specific embodiments of this application, but are not intended to limit the embodiments of this application.

Figure 1:
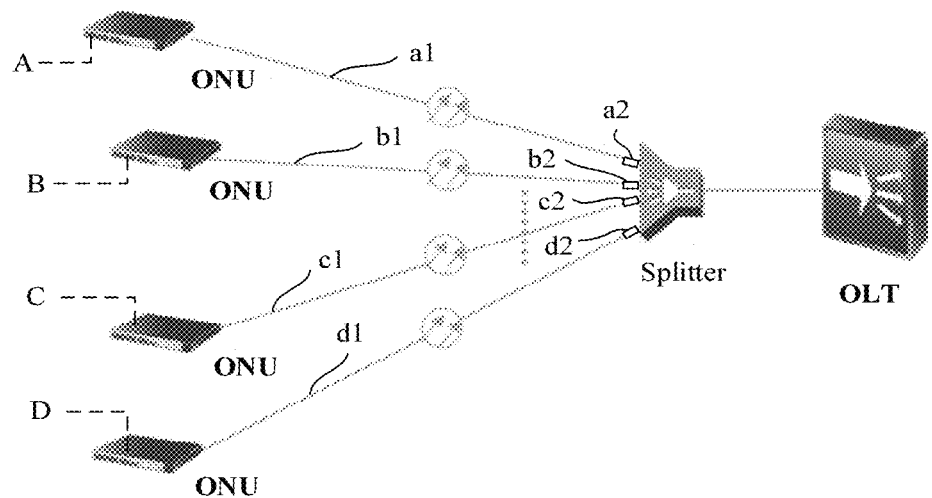
FIG. 1 is a schematic structural diagram of an optical network.

FIG. 1 shows a PON. As shown in FIG. 1, a plurality of ONUs may be connected to an OLT by using a splitter, so as to implement a point-to-multipoint connection. When the ONUs are connected to the splitter, the plurality of ONUs are connected to all output ports of the splitter by using optical fiber connectors and optical fibers.

For example, in FIG. 1, an ONU of a user A is detachably connected to an output port of the splitter by using an optical fiber a1 and an optical fiber connector a2, an ONU of a user B is detachably connected to an output port of the splitter by using an optical fiber b1 and an optical fiber connector b2, an ONU of a user C is detachably connected to an output port of the splitter by using an optical fiber c1 and an optical fiber connector c2, and an ONU of a user D is detachably connected to an output port of the splitter by using an optical fiber d1 and an optical fiber connector d2.

The ONU of each user is usually placed at home. The splitter and the OLT are located on an equipment room side. Each user accesses the splitter by using an optical fiber and a connector. There is usually a relatively long optical fiber corresponding to each user between a user side and an equipment room. These optical fibers are usually entangled together, to distinguish between connection relationships between user-side ONUs and output ports of a splitter. In an implementation, the output ports of the splitter are labeled, so that a mapping relationship between an output port of the splitter and a user is formed, and a port connected to a connector is identified through labeling. However, this manner has poor reliability, and a port connected to a connector cannot be identified because the port is artificially labeled incorrectly or a label is lost.

Therefore, when a specific user needs to replace an operator, for example, replace a mobile operator with a telecom operator, a connector needs to be disconnected from a splitter and an OLT of the mobile operator, and then connected to a splitter and an OLT provided by the telecom operator. Alternatively, when an optical fiber and a connector between an ONU of a specific user and a splitter need to be replaced or repaired, the connector connected to the ONU of the user needs to be disconnected from an output port of the splitter. However, because the output port through which the connector is connected to the splitter cannot be identified, in other words, because the output port that is of the splitter and that is connected to the ONU of the user cannot be determined, it is difficult for an installation engineer to disconnect the connector connected to the ONU of the user from the port of the splitter. Consequently, it is more difficult for the user to replace or repair a network, an optical fiber, or a connector.

Figure 2:
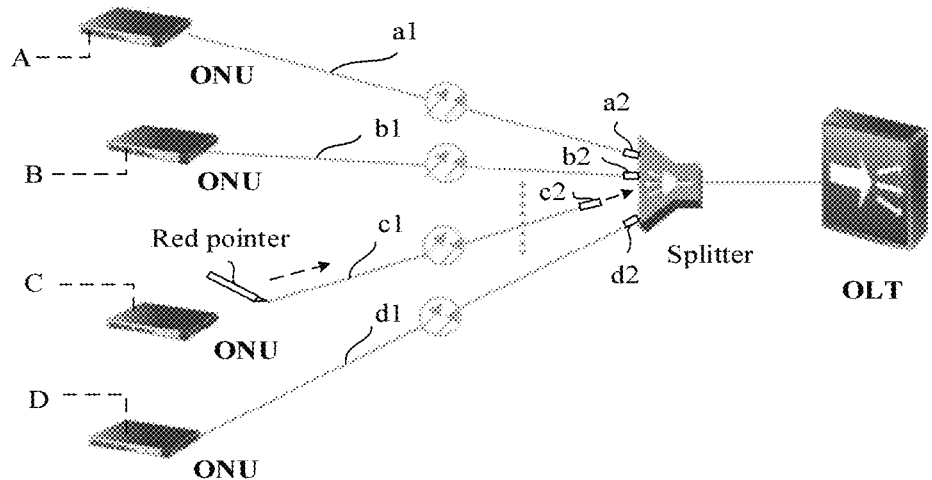
FIG. 2 is a schematic diagram of a fiber optic network for identifying a port connected to an optical fiber connector.

Another implementation for identifying a port connected to a connector is as follows. As shown in FIG. 2, an optical fiber connected to an ONU side of a user is disconnected (for example, the optical fiber c1 connected to the ONU of the user C is disconnected) on a user side, red light is input into the optical fiber by using a red pointer, and then connectors are removed from output ports of the splitter on the equipment room side for observation. If the red light is emitted from a connection end of a connector, a corresponding output port for the user on the equipment room side is identified, so that the connector can be removed from the output port of the splitter, thereby implementing an operation such as network replacement, optical fiber replacement, or connector replacement. However, in this implementation, the connectors first need to be removed from the output ports of the splitter, and then it is observed whether the red light is emitted. However, because the installation engineer does not know a specific connector from which the red light is emitted, the installation engineer needs to remove, one by one for observation, the connectors connected to the splitter. Consequently, there is likely a risk of disconnecting a connector connected to an ONU of another user from an output port of the splitter, in other words, there is a risk of interrupting a network of the other user. In addition, when there is a relatively large quantity of connectors connected to the splitter, it is relatively difficult to implement this method, and an output port connected to a connector cannot be identified accurately and quickly.

Based on this, the embodiments of this application provide a solution of accurately and quickly identifying a port connected to a connector. The connector is provided with a first light transmission part and a second light transmission part. The first light transmission part and the second light transmission part can visualize light carried on an optical fiber. In addition, the second light transmission part and the first light transmission part at least partially overlap. Therefore, when the connector is connected to an optical component, and when detection light (such as red light) is input into an optical fiber connected to a user-side ONU, the detection light can be visualized at the first light transmission part and the second light transmission part on an equipment room side, so that the detection light can be observed, and the connector can visualize the light carried on the optical fiber. In this way, an installation engineer can determine, by observing the second light transmission part on the connector on the equipment room side, the user-side ONU connected to the connector, and further identify a port through which the connector is connected to the optical component (for example, a splitter). Therefore, when a user replaces an operator, or replaces a connector or an optical fiber, or repairs a port of an optical component, a corresponding output port through which a user-side ONU is connected to an equipment-room-side splitter can be accurately and quickly identified, so that the installation engineer easily disconnects a connector from the output port of the optical component, thereby preventing a network of another user from being interrupted. Therefore, according to the connector provided in this embodiment of this application, a port through which the connector is connected to an optical component can be accurately and quickly identified, thereby helping the installation engineer to replace or repair a network of a user, and resolving a problem that it is difficult to identify a port connected to an optical fiber connector.

The following separately uses different embodiments as examples to describe a specific structure of the connector.

Embodiment 1

Figure 3:
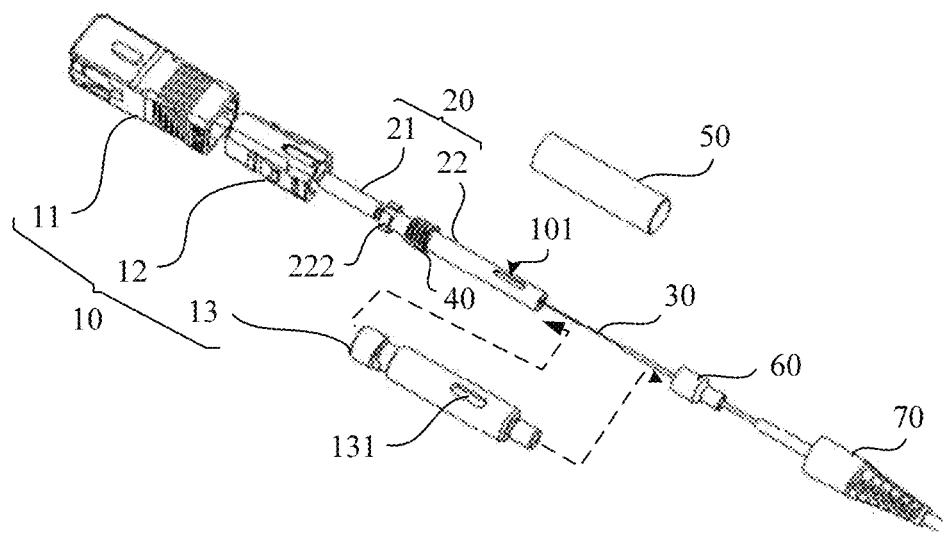
FIG. 3 is a schematic diagram of a split structure of a connector according to an embodiment of this application.
Figure 4:
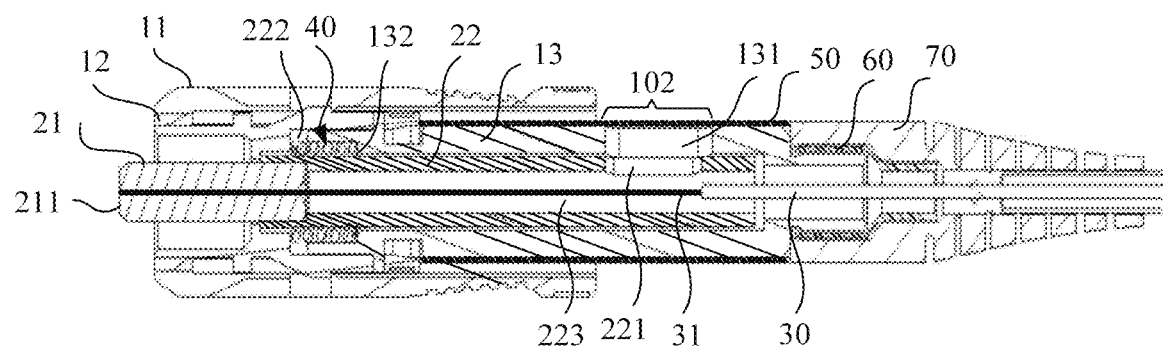
FIG. 4 is a schematic sectional view of a connector according to an embodiment of this application.

An embodiment of this application provides a connector. Referring to FIG. 3, the connector may include a housing 10, a ferrule assembly 20, where at least a part of the ferrule assembly 20 is located inside the housing 10, and an optical fiber 30, where at least a part of the optical fiber 30 is located inside the ferrule assembly 20. For example, as shown in FIG. 4, one end of the ferrule assembly 20 is located outside the housing 10, and the other end of the ferrule assembly 20 is located inside the housing 10. A part that is of the ferrule assembly 20 and that is located outside the housing 10 is configured to cooperate with a port.

Certainly, in some other examples, the ferrule assembly 20 may be all located inside the housing 10. One end of the optical fiber 30 passes through the inside of the ferrule assembly 20 from one end of the housing 10, and extends to an end face 211 of the one end that is of the ferrule assembly 20 and that is located outside the housing 10.

In this embodiment of this application, referring to FIG. 3, an outer wall of the ferrule assembly 20 is provided with a first light transmission part 101. For example, a channel through which the optical fiber 30 can pass and that penetrates two ends of the ferrule assembly 20 is disposed inside the ferrule assembly 20. Therefore, when the first light transmission part 101 is disposed on the outer wall of the ferrule assembly 20, the first light transmission part 101 is configured to visualize light carried on the optical fiber 30 inside the ferrule assembly 20. In this way, when detection light accesses the optical fiber 30, the light carried on the optical fiber 30 may be observed by using the first light transmission part 101.

It should be noted that, in this embodiment of this application, the first light transmission part 101 on the ferrule assembly 20 may be used for detection light transmission. Therefore, the first light transmission part 101 may be a light transmission hole, or the first light transmission part 101 may be a light transmission area made of transparent materials, and the transparent materials may be, for example, transparent glass, transparent silica gel, or transparent plastic, or the first light transmission part 101 is a light transmission part including both a light transmission hole and a light transmission area.

In this embodiment of this application, referring to FIG. 4, the housing 10 is provided with a second light transmission part 102. The second light transmission part 102 can visualize the light carried on the optical fiber 30. In addition, the first light transmission part 101 and the second light transmission part 102 at least partially overlap. For example, the first light transmission part 101 and the second light transmission part 102 partially overlap, or the first light transmission part 101 and the second light transmission part 102 completely overlap. When the first light transmission part 101 and the second light transmission part 102 at least partially overlap, the first light transmission part 101 and the second light transmission part 102 constitute a visible window. The light (for example, visible light) carried on the optical fiber 30 inside the connector may be observed by using the visible window. In other words, in this embodiment of this application, the first light transmission part 101 and the second light transmission part 102 are used to observe the light carried on the optical fiber 30.

For example, when detection light (such as red light) passes through the optical fiber 30, the detection light may penetrate the first light transmission part 101 and then may be emitted from the second light transmission part 102 to the outside, or the detection light carried on the optical fiber 30 may be observed on the second light transmission part 102. In this way, the second light transmission part 102 and the first light transmission part 101 enable the connector to have a visible area, and the light carried on the optical fiber 30 inside the connector can be visualized by using the visible area. Therefore, an installation engineer can determine, by observing the detection light on the second light transmission part 102, a user-side ONU connected to the connector and a port through which the connector is connected to a splitter.

In this embodiment of this application, the second light transmission part 102 may be a light transmission hole, or the second light transmission part 102 may be a light transmission area made of transparent materials, or the second light transmission part 102 may be a visible area that includes both a light transmission hole and a light transmission area and through which light can pass.

It should be noted that, when a network of a specific user is replaced or repaired, an optical fiber 30 of another user is in a normal transmission state. In this case, when input detection light is the same as normal service light on the optical fiber 30, the same light is observed by second light transmission parts 102 on a plurality of connectors connected to a plurality of ports of a splitter on an equipment room side. Consequently, a connector corresponding to the user and a port connected to the connector cannot be identified.

To identify a plurality of connectors, detection light that is input into the optical fiber 30 and service light (that is, transmission signal light) that is input into the optical fiber 30 are distinguished. For example, the service light that is input into the optical fiber 30 may be invisible light with a wavelength of 1310 nanometers (nm), 1490 nm, or 1550 nm, and the detection light may be visible light such as red light or blue light. In this way, when a connector connected to another port of the splitter is in a normal working state, a second light transmission part 102 on the other connector is easily distinguished from a second light transmission part 102 on a connector through which red light passes. For example, when a specific user needs to replace a network, red light is input into an optical fiber 30 connected to a user-side ONU. In this case, if a second light transmission part 102 on one of a plurality of connectors observes the red light, the connector corresponding to the user and a port corresponding to the connector can be identified, so that the connectors are identified.

Figure 5:
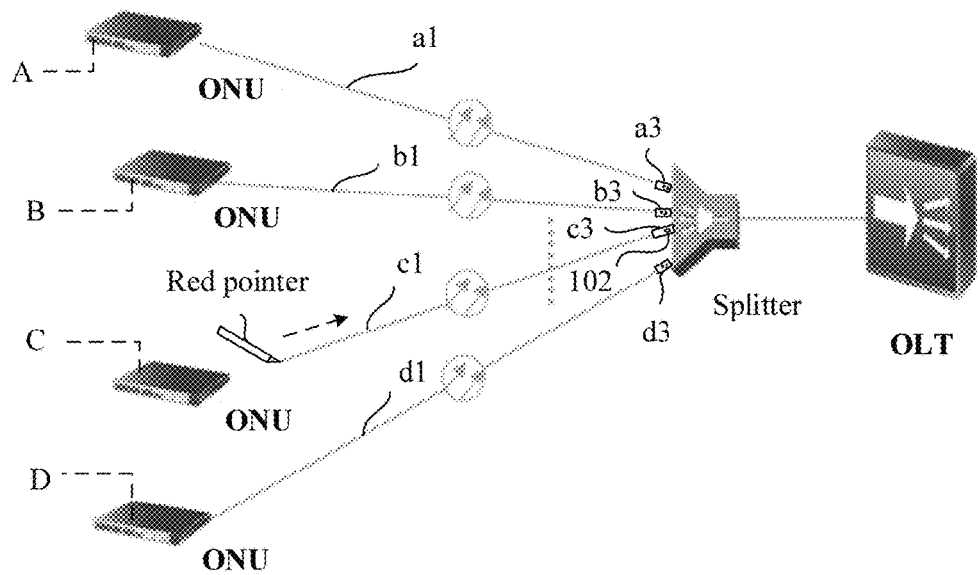
FIG. 5 is a schematic diagram of identifying a connector in a fiber optic network according to an embodiment of this application.

When the connector provided in this embodiment of this application is applied to an optical network, for example, as shown in FIG. 5, an ONU of a user A is detachably connected to an output port of a splitter by using an optical fiber a1 and a connector a3, an ONU of a user B is detachably connected to an output port of the splitter by using an optical fiber b1 and a connector b3, an ONU of a user C is detachably connected to an output port of the splitter by using an optical fiber c1 and a connector c3, and an ONU of a user D is detachably connected to an output port of the splitter by using an optical fiber d1 and a connector d3.

When the user C needs to replace a network, for example, replace a telecom operator with a mobile operator, or replace the connector c3 or the optical fiber c1, or repair the port connected to the connector c3, the optical fiber c1 connected to the ONU of the user C that is placed at home is disconnected, the connector c3 maintains a state of being connected to the splitter, and red light is input into the optical fiber c1 by using a red pointer. In this case, a second light transmission part 102 on the connector c3 can observe the red light, but second light transmission parts 102 on the connector a3, the connector b3, and the connector d3 cannot observe the light (because the service light on the optical fiber 30 is invisible). Therefore, the installation engineer accurately and quickly identify, based on the red light on the second light transmission part 102, the connector c3 and the port that correspond to the user C, so that the installation engineer can disconnect the connector c3 from the splitter to access another operator.

Certainly, in some examples, if a plurality of users such as the user A, the user B, the user C, and the user D need to perform network replacement simultaneously, only detection light that is input by the users needs to be distinguished. For example, the user C uses red light, the user B uses blue light, the user D uses green light, and the user A uses yellow light. In this case, corresponding users can be identified based on different colors observed by second light transmission parts 102 on a plurality of corresponding connectors on the equipment room side. Therefore, according to the connector provided in this embodiment of this application, an objective of simultaneously replacing or repairing networks of a plurality of users can be further achieved.

Compared with FIG. 2, according to the connector provided in this embodiment of this application, a network of another user is prevented from being interrupted, and a connector is prevented from being disconnected from a port to identify the port connected to the connector.

It should be noted that, to achieve port identification when a connector is connected to a port, in this embodiment of this application, the second light transmission part 102 on the housing 10 is not blocked after the connector is plug-connected to the port, to be specific, the second light transmission part 102 on the connector can observe the detection light on the optical fiber 30 inside the connector after the connector is plugged-connected to the port. Therefore, the second light transmission part 102 on the housing 10 is located on a top surface or a bottom surface of the housing 10, or on a side surface between the two ends of the housing 10. However, the second light transmission part 102 usually cannot be disposed on an end face of one end that is of the housing 10 and that faces the port.

In a possible implementation, still referring to FIG. 3, the ferrule assembly 20 may include a ferrule 21 and a flange 22 connected to one end of the ferrule 21. At least a part of the ferrule 21 is located at one end of the housing 10. For example, as shown in FIG. 4, one end of the ferrule 21 is located inside the housing 10, and the other end of the ferrule 21 is located outside the housing 10. Referring to FIG. 4, one end that is of the flange 22 and that is away from the ferrule 21 extends to the other end of the housing 10.

A channel 223 through which the optical fiber 30 can pass is disposed inside the ferrule 21 and the flange 22. For example, a channel through which light can pass is disposed inside the ferrule 21, and the channel penetrates the two ends of the ferrule 21. The channel 223 is also disposed inside the flange 22, and the channel 223 penetrates two ends of the flange 22. One end of the flange 22 may be connected to one end of the ferrule 21 in a gripping manner. For example, one end of the flange 22 is gripped on one end of the ferrule 21. Alternatively, the flange 22 may be connected to the ferrule 21 through plug-connection, clamping, or fastening.

In this embodiment of this application, the first light transmission part 101 may be disposed on an outer wall of the ferrule 21. Alternatively, as shown in FIG. 3, the first light transmission part 101 is disposed on an outer wall of the flange 22. Alternatively, the first light transmission part 101 may be disposed on an outer wall of each of the ferrule 21 and the flange 22.

In this embodiment of this application, the first light transmission part 101 may include at least one of a first light transmission hole 221 and a first light transmission area (not shown) made of transparent materials. For example, the first light transmission part 101 is the first light transmission hole 221 shown in FIG. 4. Certainly, in some examples, the first light transmission part 101 may alternatively be the first light transmission area, or the first light transmission part 101 may include both the first light transmission hole 221 and the first light transmission area.

In this embodiment of this application, an example in which the first light transmission hole 221 disposed on the outer wall of the flange 22 is the first light transmission part 101 is used for specific description.

Referring to FIG. 4, the channel 223 is disposed inside the flange 22, and the first light transmission hole 221 connected to the channel 223 is disposed on the outer wall of the flange 22. Therefore, the detection light on the optical fiber 30 may penetrate the first light transmission hole 221 or may be observed from the first light transmission hole 221.

In a possible implementation, referring to FIG. 3 and FIG. 4, the housing 10 may include an outer housing 11 and an inner housing, where at least a part of the inner housing is located inside the outer housing 11. The inner housing may include a frame sleeve 12 and a base 13. The outer housing 11 is sleeved on at least the frame sleeve 12. At least a part of the ferrule 21 is located inside the frame sleeve 12. The base 13 is sleeved on at a part of the outer wall of the flange 22. One end of the base 13 is connected to the frame sleeve 12. A part of the base 13 is located inside the outer housing 11.

Referring to FIG. 4, the second light transmission part 102 is disposed on the base 13 in the inner housing. Certainly, in some examples, the second light transmission part 102 may alternatively be disposed on the outer housing 11, or the second light transmission part 102 is disposed on the frame sleeve 12 in the inner housing, or the second light transmission part 102 is disposed on each of the outer housing 11 and an outer wall of the base 13 in the inner housing.

In this embodiment of this application, the second light transmission part 102 may include at least one of a second light transmission hole and a second light transmission area (not shown) made of transparent materials. For example, the second light transmission part 102 may be the second light transmission hole. The second light transmission hole may be disposed on the outer housing 11, or may be disposed on the base 13. For example, as shown in FIG. 3, a second light transmission hole 131 is disposed on the base 13, and the second light transmission hole 131 is used as the second light transmission part 102. Referring to FIG. 4, the first light transmission part 101 (that is, the first light transmission hole 221) and the second light transmission part 102 (that is, the second light transmission hole 131) are disposed in an up-down overlapping manner. The first light transmission hole 221 and the second light transmission hole 131 constitute a viewable window, and the light on the optical fiber 30 can be visualized by using the visible window.

Alternatively, the second light transmission part 102 may be the second light transmission area, or the second light transmission part 102 may include both the second light transmission hole and the second light transmission area.

In a possible implementation, referring to FIG. 4, one end of the base 13 extends into the outer housing 11 and is connected to the frame sleeve 12 inside the inner housing 11, and the other end of the base 13 extends out of the outer housing 11. The base 13 is sleeved on the part of the outer wall of the flange 22. In addition, one end of the base 13 is close to one end that is of the flange 22 and that faces the ferrule 21. The second light transmission hole 131 is disposed on an outer wall that is of the base 13 and that extends out of the outer housing 11.

Certainly, in some examples, a part or all of the outer wall that is of the base 13 and that extends out of the outer housing 11 may alternatively be the second light transmission area. Alternatively, a part of the outer wall that is of the base 13 and that extends out of the outer housing 11 is the second light transmission area, a part of the outer wall that is of the base 13 and that extends out of the outer housing 11 is provided with the second light transmission hole 131, and the second light transmission hole 131 and the second light transmission area at least partially overlap. In other words, when the second light transmission part 102 is disposed on the base 13, the second light transmission part 102 is a light transmission part including both the second light transmission hole 131 and the second light transmission area.

In a possible implementation, the connector further includes an elastic component 40. The elastic component 40 is sleeved on the flange 22. In addition, one end of the elastic component 40 presses against a protrusion 222 on the outer wall of the flange 22, and the other end of the elastic component 40 presses against a boss 132 on an inner wall of one end of the base 13. The elastic component 40 is configured to arrange the ferrule assembly 20 in the housing 10 in a telescopic manner. Therefore, after the end surface 211 of the ferrule 21 is subject to external force, the ferrule 21 and the flange 22 may move towards the housing 10, and the elastic component 40 is compressed. In addition, elastic force of the elastic component 40 drives the flange 22, so that one end of the ferrule 21 may be in close contact with a contact in the port.

In a possible implementation, the housing 10 further includes a light transmission sleeve 50 on which the outer housing 11 or the base 13 is sleeved. The light transmission sleeve 50 covers at least the second light transmission hole 131 or the second light transmission area. For example, as shown in FIG. 4, the light transmission sleeve 50 is sleeved on an outer wall of the base 13. Because the light transmission sleeve 50 is translucent, the second light transmission part 102 may include the second light transmission hole 131 on the base 13 and a light transmission area corresponding to the light transmission sleeve 50 and the second light transmission hole 131. In other words, a part of an area of the light transmission sleeve 50 may be used as the second light transmission area.

In a possible implementation, referring to FIG. 3 and FIG. 4, the connector further includes a tail ferrule 70. The tail ferrule 70 is connected to one end that is of the base 13 and that is located outside the outer housing 11. In addition, one end of the optical fiber 30 passes through the tail ferrule 70 and enters the ferrule assembly 20.

In a possible implementation, referring to FIG. 3 and FIG. 4, the connector further includes a pressure ring 60. The pressure ring 60 is located at one end that is of the tail ferrule 70 and that is close to the base 13. The pressure ring 60 is configured to fasten the optical fiber 30 inside the tail ferrule 70.

Figure 6:
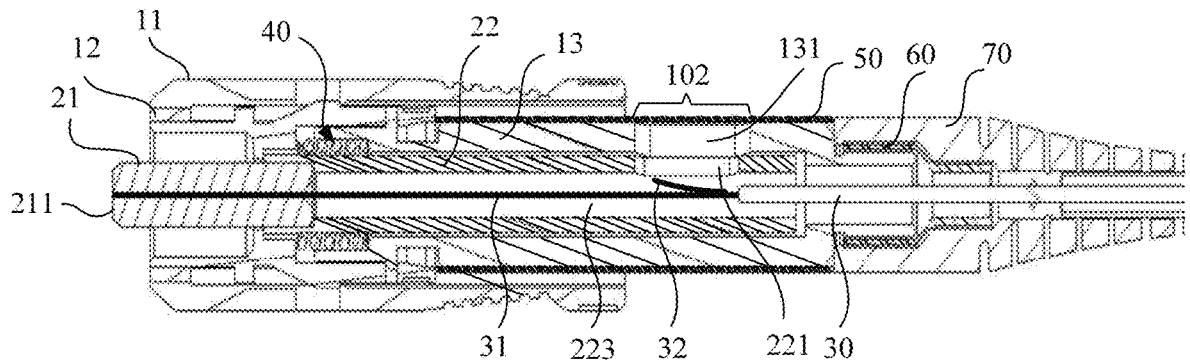
FIG. 6 is a schematic sectional view of a connector according to an embodiment of this application.

In this embodiment of this application, to increase brightness of the connector on the second light transmission part 102, referring to FIG. 6, the optical fiber 30 includes a main optical fiber 31 and a branch optical fiber 32 connected to the main optical fiber 31. One end of the main optical fiber 31 passes through the channel inside the ferrule assembly 20 and extends to the end face 211 the one end of the ferrule assembly 20.

Figure 8A:
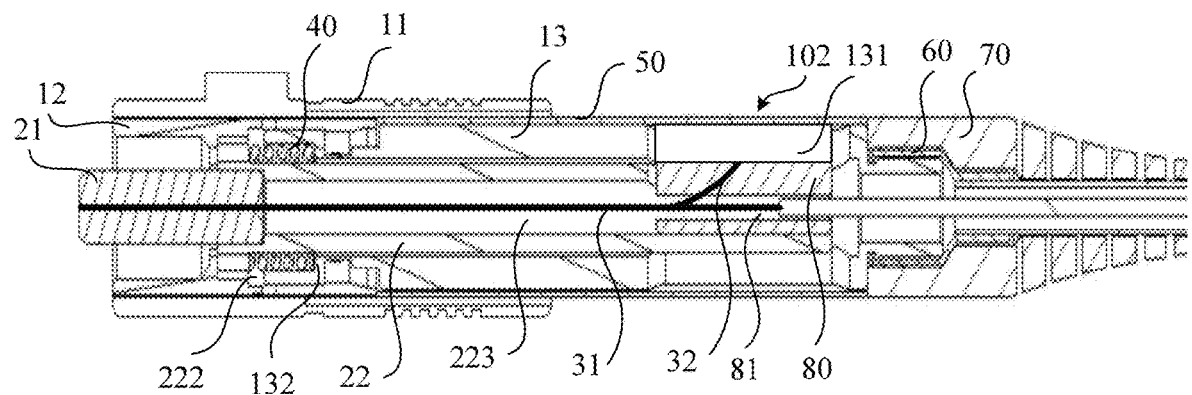
FIG. 8A is a schematic sectional view of a connector according to an embodiment of this application.
Figure 8B:
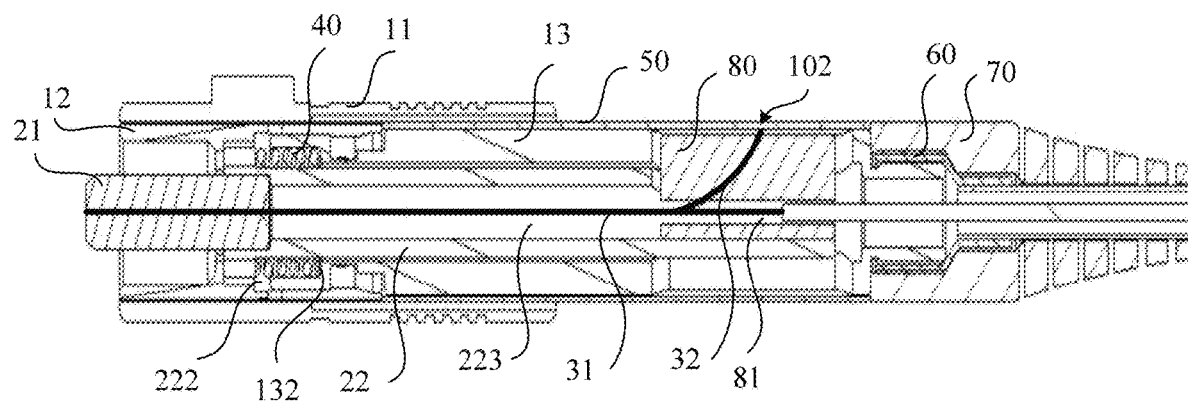
FIG. 8B is a schematic sectional view of a connector according to an embodiment of this application.
Figure 11:
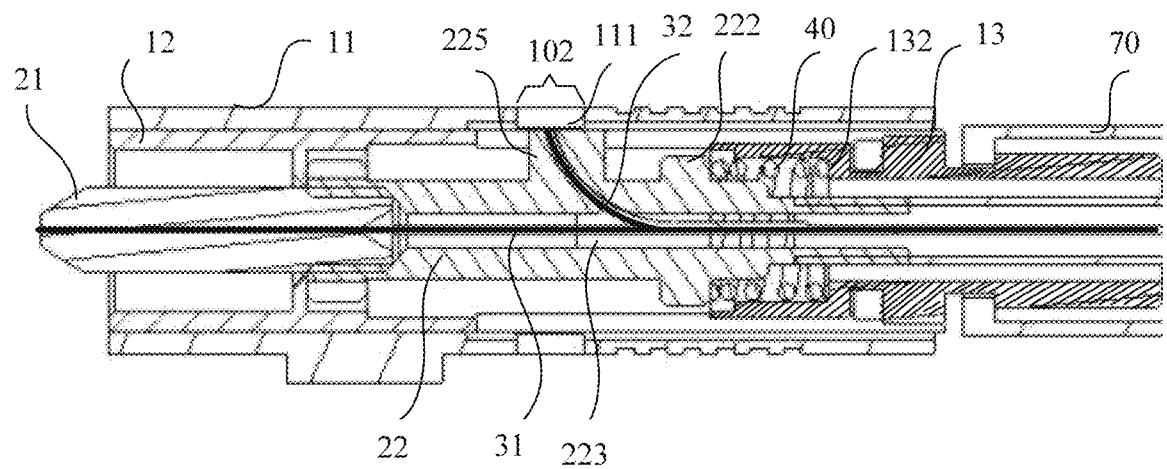
FIG. 11 is a schematic sectional view of a connector according to an embodiment of this application.

The branch optical fiber 32 is opposite to the first light transmission part 101 (as shown in FIG. 6), or the branch optical fiber 32 passes through the first light transmission part 101 and extends to the second light transmission part 102 (as shown in FIG. 8B and FIG. 11 below).

In this embodiment of this application, to increase a light intensity of the connector on the second light transmission part 102, referring to FIG. 6, the optical fiber 30 includes a main optical fiber 31 and a branch optical fiber 32 connected to the main optical fiber 31. One end of the main optical fiber 31 passes through the ferrule assembly 20 and extends to the end face 211 of the one end of the ferrule assembly 20. The branch optical fiber 32 is opposite to the first light transmission part 101 (as shown in FIG. 6), or the branch optical fiber 32 passes through the first light transmission part 101 and extends to the second light transmission part 102 (as shown in FIG. 8B and FIG. 11 below).

The branch optical fiber 32 is disposed, and the branch optical fiber 32 corresponds to the first light transmission part 101 or passes through the first light transmission part 101. Therefore, when detection light on the branch optical fiber 32 is observed on the second light transmission part 102, light brightness is higher, and the installation engineer can more easily identify the connector.

In this embodiment of this application, a proportion of a light transmission amount on the branch optical fiber 32 to a light transmission amount on the optical fiber 30 is less than or equal to 3%. For example, if the proportion of the light transmission amount on the branch optical fiber 32 to the light transmission amount on the optical fiber 30 is 3%, a light transmission amount on the main optical fiber 31 accounts for 97%.

In this embodiment of this application, the optical fiber 30 may obtain 3% light through splitting by using a taper technology, and the 3% light is used as the branch optical fiber 32, and remaining 97% light is transmitted to the ferrule 21. It should be noted that the taper technology is an existing technology. For details, refer to a taper technology in an existing process of manufacturing the optical fiber 30.

It should be noted that the branch optical fiber 32 may face the ferrule 21, or the branch optical fiber 32 may face the tail ferrule 70.

Embodiment 2

A difference between this embodiment of this application and Embodiment 1 is as follows. In this embodiment of this application, the branch optical fiber 32 passes through the first light transmission hole 221 and is close to the second light transmission part 102.

Figure 7:
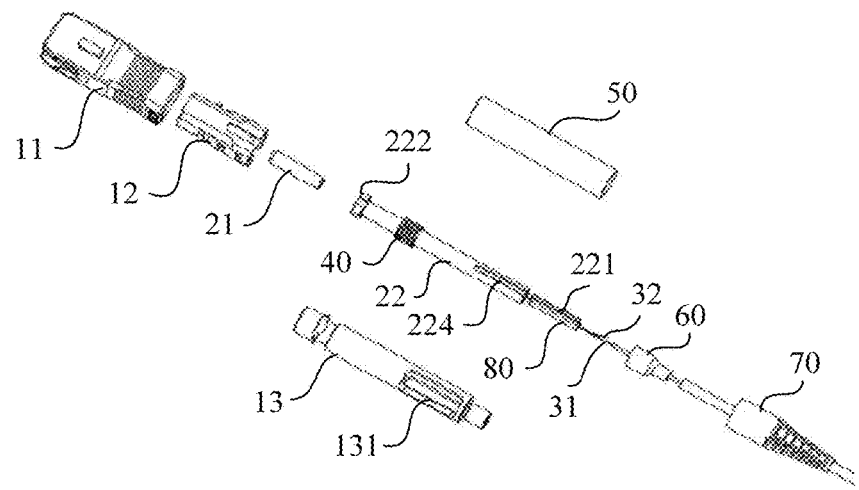
FIG. 7 is a schematic diagram of a split structure of a connector according to an embodiment of this application.
Figure 9:
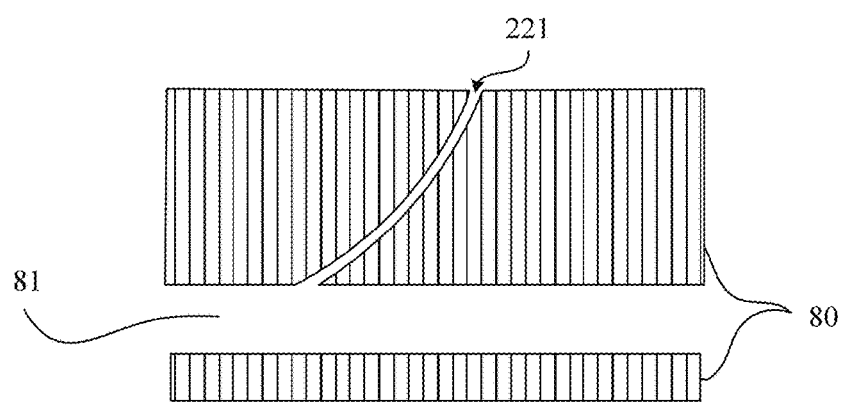
FIG. 9 is a schematic sectional view of a guide structure in a connector according to an embodiment of this application.

Referring to FIG. 7, the outer wall of the flange 22 is provided with a mounting hole 224, and a guide structure 80 is assembled at the mounting hole 224. Referring to FIG. 8A and FIG. 9, the guide structure 80 is provided with a guide channel 81 connected to the channel inside the flange 22, and the guide structure 80 is provided with the first light transmission hole 221 connected to the guide channel 81. In other words, in this embodiment of this application, the first light transmission part 101 is the first light transmission hole 221, and the first light transmission hole 221 is disposed on the guide structure 80 installed on the flange 22.

Certainly, in some examples, a part or all of an area of the guide structure 80 is the first light transmission area, or a part of an area of the guide structure 80 is provided with the first light transmission hole 221, a part of the area of the guide structure 80 is the first light transmission area, and the first light transmission hole 221 and the first light transmission area at least partially overlap. In other words, when the first light transmission part 101 is disposed on the guide structure 80, the first light transmission part 101 includes the first light transmission area and the first light transmission hole 221.

Referring to FIG. 8A, the branch optical fiber 32 passes through the first light transmission hole 221 and extends to the second light transmission part 102. Therefore, detection light on the branch optical fiber 32 is emitted outwards by using the second light transmission part 102, and the second light transmission part 102 on the connector may be bright. In this way, the installation engineer can quickly identify the connector based on a bright position.

Referring to FIG. 7, a second light transmission hole 131 is disposed on the base 13. Referring to FIG. 8B, one end of the guide structure 80 extends into the second light transmission hole 131. Therefore, in this embodiment of this application, the second light transmission part 102 is an exposed area of the first light transmission hole 221 at the guide structure 80.

In this embodiment of this application, as shown in FIG. 8A and FIG. 8B, the light transmission sleeve 50 is sleeved on an outer wall of the base 13, and the light transmission sleeve 50 covers at least the second light transmission hole 131, so that the light transmission sleeve 50 covers one end that is of the guide structure 80 and at which the first light transmission hole 221 is disposed. In this case, the second light transmission part 102 is a light transmission area that is of the light transmission sleeve 50 and that corresponds to one end of the branch optical fiber 32. During connector identification, the connector can be identified when detection light can be emitted from the area of the light transmission sleeve 50.

In this embodiment of this application, the guide structure 80 may be made of non-transparent metal materials or non-metal materials. Certainly, the guide structure 80 may alternatively be made of transparent materials.

Embodiment 3

A difference between this embodiment of this application and each of Embodiment 1 and Embodiment 2 is as follows In this embodiment of this application, the flange 22 has a branch structure 225, and the first light transmission hole 221 is disposed on the branch structure 225. To be specific, the first light transmission part 101 is disposed on the branch structure 225, and the first light transmission part 101 is the first light transmission hole 221. The branch optical fiber 32 passes through the first light transmission hole 221 and is close to the second light transmission part 102 on the outer housing 11.

Certainly, in some examples, when the first light transmission part 101 is disposed on the branch structure 225, the first light transmission part 101 may alternatively be a first light transmission area made of transparent materials. For example, a part or all of an area of the branch structure 225 may be the first light transmission area. In addition, an outer wall that is of the flange 22 and that is connected to the branch structure 225 is provided with the first light transmission hole 221 connected to the channel 223 inside the flange 22. In other words, the first light transmission part 101 disposed on the branch structure 225 includes the first light transmission area and the first light transmission hole 221.

Alternatively, the branch structure 225 is provided with the first light transmission hole 221, but the first light transmission hole 221 is not connected to the channel 223 inside the flange 22. An area of the outer wall that is of the flange 22 and that is connected to the branch structure 225 is the first light transmission area. The branch structure 225 is disposed in the first light transmission area of the flange 22. The first light transmission hole and the first light transmission area at least partially overlap. In other words, the first light transmission part 101 includes the first light transmission area on the flange 22 and the first light transmission hole 221 on the branch structure 225.

Figure 10:
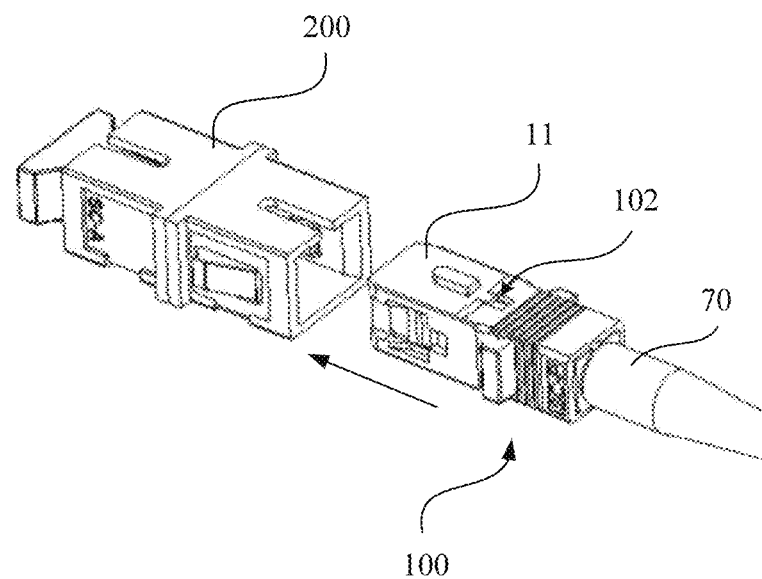
FIG. 10 is a schematic diagram of a split structure of a connector according to an embodiment of this application.

Referring to FIG. 10, when a connector 100 is connected to a port of an optical component (for example, a splitter or an OLT), the connector 100 is plug-connected to an adapter 200 on the port of the optical component, and the second light transmission part 102 is located on the outer housing 11. In this embodiment of this application, a second light transmission hole 111 is disposed on the outer housing 11 as the second light transmission part 102.

Certainly, in some examples, when the second light transmission part 102 is disposed on the outer housing 11, the second light transmission part may alternatively be a second light transmission area. Therefore, a part or all of an area of the outer housing 11 is the second light transmission area, or a part of an area of the outer housing 11 is the second light transmission area, a part of the area of the outer housing 11 is provided with the second light transmission hole 111, and the second light transmission hole 111 and the second light transmission area at least partially overlap. In other words, the second light transmission part 102 disposed on the outer housing 11 includes the second light transmission hole 111 and the second light transmission area.

As shown in FIG. 11, one end of the base 13 extends into the frame sleeve 12 and is connected to the frame sleeve 12, and the other end of the base 13 extends out of the outer housing 11 and the frame sleeve 12. One end of the flange 22 is connected to the ferrule 21, and the other end of the flange 22 extends into the one end that is of the base 13 and that is located inside the frame sleeve 12. The outer housing 11 has the second light transmission hole 111.

An opening is disposed at a position at which the frame sleeve 12 corresponds to the second light transmission hole 111. One end of the branch structure 225 may pass through the opening. The elastic component 40 is located at the one end that is of the base 13 and that extends into the frame sleeve 12. An outer wall of one end that is of the flange 22 and that is close to the base 13 has a protrusion 222.

Figure 12:
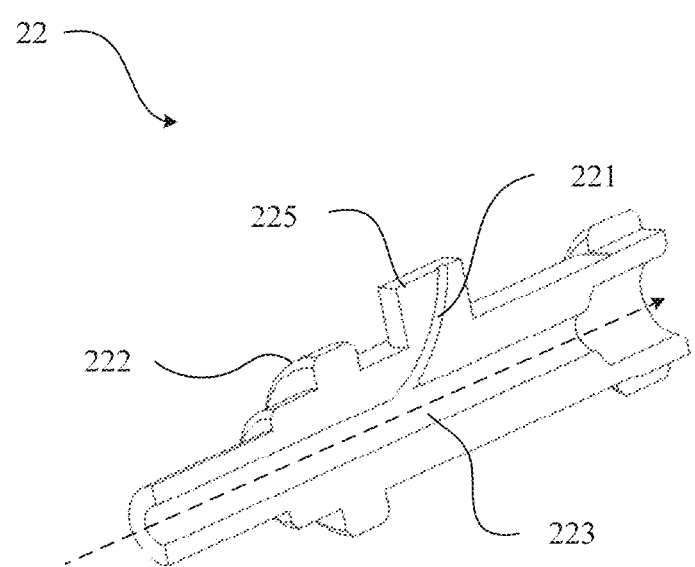
FIG. 12 is a schematic diagram of a split structure of a base in a connector according to an embodiment of this application.

Referring to FIG. 12, the channel 223 is disposed inside the flange 22, the outer wall of the flange 22 is provided with the branch structure 225 that extends towards the second light transmission part 102, and the first light transmission hole 221 that is connected to the channel 223 is disposed inside the branch structure 225.

Still referring to FIG. 11, one end of the branch structure 225 passes through the opening disposed on the frame sleeve 12 and extends to the second light transmission hole 111, and one end of the branch optical fiber 32 passes through the first light transmission hole 221 and extends to the second light transmission hole 111. Therefore, when there is detection light on the branch optical fiber 32, the detection light may be observed on the second light transmission hole 111 on the outer housing 11, and the installation engineer may identify, based on the light on the second light transmission hole 111 on the connector, a corresponding output port through which a user-side ONU is connected to an equipment-room-side splitter.

In this embodiment of this application, the branch structure 225 may be inclined upward towards the ferrule 21, which is shown in FIG. 11, or the branch structure 225 may be disposed obliquely towards the tail ferrule 70.

In this embodiment of this application, the branch structure 225 is disposed, and the first light transmission hole 221 is disposed on the branch structure 225. Therefore, the branch optical fiber 32 is led out, so that the detection light is emitted from the second light transmission part 102 on the connector. In this way, the installation engineer can observe a bright area from an outer surface of the connector, thereby helping port identification.

It should be noted that, in this embodiment of this application, the light transmission sleeve 50 may alternatively be sleeved on the outer housing 11, and the light transmission sleeve 50 may cover at least the second light transmission hole 111 on the outer housing 11. In this way, dust or liquid is prevented from entering the channel 223 inside the flange 22 through the second light transmission hole 111 and the first light transmission hole 221, thereby preventing signal transmission of the main optical fiber 31 from being affected.

In the descriptions of the embodiments of this application, it should be noted that, unless otherwise clearly specified and limited, terms "install", and "connect" should be understood in a broad sense. For example, the terms may be used for a fixed connection, a connection through intermediate media, an internal connection between two elements, or interaction between two elements. A person of ordinary skill in the art may understand specific meanings of the terms in the embodiments of this application based on specific cases.

In this specification, claims, and the accompanying drawings of the embodiments of this application, the terms "first", "second", "third", "fourth", and the like (if existent) are intended to distinguish between similar objects, but do not necessarily indicate a specific order or sequence.

What is claimed is:

1. A connector, comprising:
    a housing;
    a ferrule assembly disposed at least partially inside the housing, wherein the ferrule assembly comprises:
        a first outer wall;
        a ferrule comprising a first end;
        a flange coupled to the first end and comprising a second outer wall, wherein the second outer wall comprises a mounting hole; and
        a first channel disposed inside the ferrule and the flange, wherein a guide structure is assembled at the mounting hole, and wherein the guide structure comprises:
            a guide channel coupled to the first channel; and
            a first light transmission hole coupled to the guide channel;
    an optical fiber disposed at least partially inside the ferrule assembly, wherein the optical fiber comprises a main optical fiber and a branch optical fiber extending diagonally from the main optical fiber;
    a first light transmission part disposed on the first outer wall; and
    a second light transmission part disposed on the housing, wherein a second light-transmitting hole in the second light transmission part and the first light-transmitting hole in the first light transmission part at least partially overlap to define a visible window configured for observation of light carried on the optical fiber via at least one of the main optical fiber or the branch optical fiber.

2. The connector of claim 1, wherein the housing comprises a second end and a third end, wherein the ferrule further comprises a third outer wall and a third part located at the first end, wherein the flange further comprises a fourth end located away from the ferrule and extending to the third end, wherein the optical fiber is configured to pass through the first channel, and wherein the first light transmission part is further disposed on:
    the second outer wall;
    the third outer wall; or
    each of the second outer wall and the third outer wall.

3. The connector of claim 2, wherein the first light transmission hole is configured to visualize light carried on the optical fiber, and wherein the first light transmission part comprises a first light transmission area made of transparent materials.

4. The connector of claim 3, wherein the first light transmission hole is coupled to the first channel, wherein the second outer wall comprises a branch structure, and wherein the branch structure comprises the first light transmission hole.

5. The connector of claim 1, wherein the guide structure further comprises at least one of:
    the first light transmission hole, wherein the first light transmission hole is coupled to the guide channel;
    a fourth part or all of an area of the guide structure that is the first light transmission area; or
    the fourth part comprising the first light transmission hole, a fifth part of the area of the guide structure, wherein the first light transmission hole and the first light transmission area are configured to partially overlap.

6. The connector of claim 5, wherein the guide structure further comprises a fourth outer wall, and wherein the fourth outer wall comprises a sixth part that extends to the second light transmission part.

7. The connector of claim 2, wherein the main optical fiber comprises a sixth end passing through the first channel and extending to an end face of a seventh end of the ferrule assembly, wherein the branch optical fiber extends diagonally away from the main optical fiber towards at least one of the first light transmission part or the second light transmission part.

8. The connector of claim 2, wherein the second light transmission hole is configured to visualize light carried on the optical fiber, and wherein the second light transmission part comprises a second light transmission area made of transparent materials.

9. The connector of claim 8, wherein the housing comprises:
    an outer housing; and
    an inner housing comprising a seventh part located inside the outer housing, wherein an eighth part of the ferrule assembly is located inside the inner housing, and wherein the second light transmission part is disposed on:
        the outer housing;
        the inner housing; or
        each of the outer housing and the inner housing.

10. The connector of claim 9, wherein the inner housing further comprises:

a frame sleeve, wherein the outer housing is sleeved on the frame sleeve, and wherein a ninth part of the ferrule is located inside the frame sleeve; and a base sleeved on a tenth part of the third outer wall and comprising:
- an eighth end coupled to the frame sleeve;
- an eleventh part disposed inside the outer housing; and
- the second light transmission part.

11. The connector of claim 10, further comprising an elastic component sleeved on the flange and configured to enable the ferrule assembly to be scalable in the housing, wherein the elastic component comprises:
- a ninth end that presses against a protrusion on the third outer wall; and
- a tenth end that presses against a boss on an inner wall of an eleventh end of the base.

12. The connector of claim 11, wherein the eighth end extends into the frame sleeve and is coupled to the frame sleeve, wherein the eleventh end extends out of the outer housing and the frame sleeve, and wherein the flange further comprises:
- a twelfth end coupled to the ferrule; and
- a thirteenth end extending into the eleventh end,
- wherein the outer housing comprises at least one of:
  - the second light transmission hole;
  - a twelfth part or all of an area of the outer housing that is the second light transmission area; or
  - the twelfth part that is the second light transmission area, a thirteenth part of the area of the outer housing comprising the second light transmission hole, wherein the second light transmission hole and the second light transmission area are configured to partially overlap, and
- wherein the connector further comprises:
  - an opening disposed at a position at which the frame sleeve is opposite to the second light transmission hole or the second light transmission area, wherein the elastic component is disposed at the eighth end; and
  - a fifth outer wall disposed at a fourteenth end of the flange proximate to the base, wherein the fifth outer wall comprises the protrusion.

13. The connector of claim 11, wherein the eighth end extends into the outer housing and is coupled to the frame sleeve, wherein the eleventh end extends out of the outer housing, wherein the base is sleeved on the tenth part, and wherein the eighth end is proximate to a twelfth end of the flange.

14. The connector of claim 12, wherein the housing further comprises a light transmission sleeve on which the outer housing or the base is sleeved, and wherein the light transmission sleeve is configured to cover at least the second light transmission hole or the second light transmission area.

15. The connector of claim 3, wherein the third outer wall comprises:
- a branch structure, wherein a fourth part or all of an area of the branch structure is the first light transmission area; and
- the first light transmission hole coupled to the first channel.

16. The connector of claim 3, wherein the third outer wall comprises a branch structure, wherein the branch structure comprises the first light transmission hole, wherein an area of the third outer wall coupled to the branch structure is the first light transmission area, and wherein the first light transmission hole and the first light transmission area are configured to partially overlap.

17. The connector of claim 2, wherein the optical fiber is configured to transmit a greater proportion of light via the main optical fiber than the branch optical fiber coupled to the main optical fiber, and wherein the branch optical fiber passes through the first light transmission part and extends to the second light transmission part.

18. The connector of claim 13, wherein the base further comprises a sixth outer wall that extends out of the outer housing, and wherein the sixth outer wall comprises the second light transmission hole.

19. The connector of claim 13, wherein the base further comprises a sixth outer wall that extends out of the outer housing, and wherein a fourteenth part or all of the sixth outer wall comprises the second light transmission area.

20. The connector of claim 13, wherein the base further comprises a sixth outer wall that extends out of the outer housing, wherein a fourteenth part of the sixth outer wall comprises the second light transmission area, wherein a fifteenth part of the sixth outer wall comprises the second light transmission hole, and wherein the second light transmission hole and the second light transmission area are configured to partially overlap.

* * * * *